Figure 1:
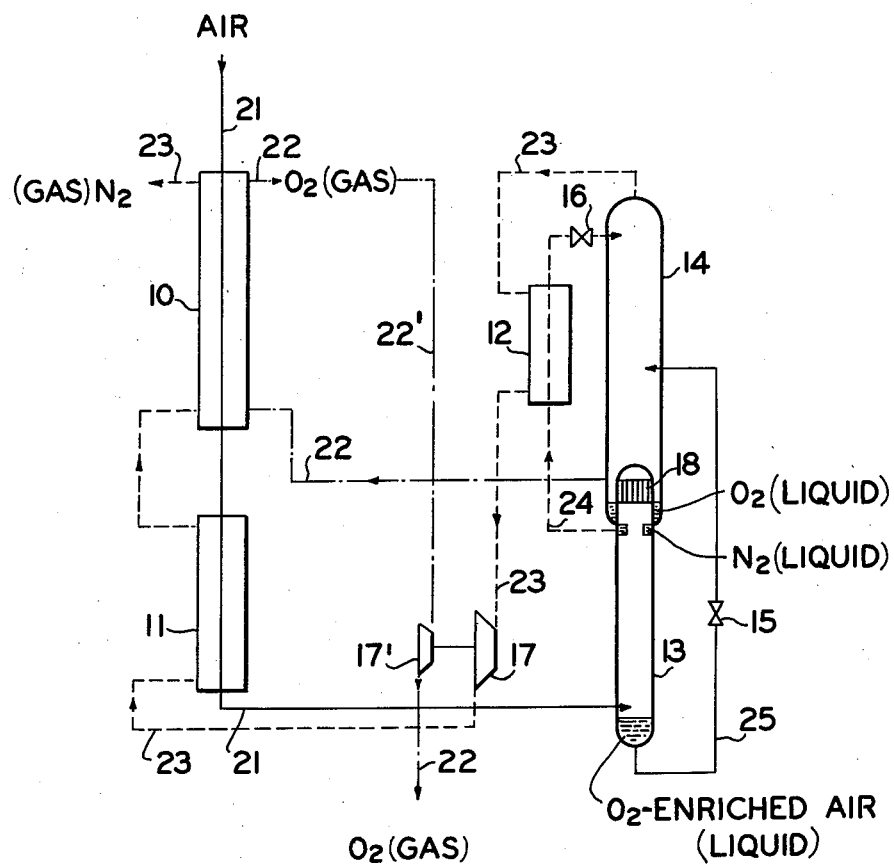

Jan. 1, 1963   M. S. W. RUHEMANN ETAL   3,070,966
PRODUCTION OF OXYGEN
Filed March 28, 1961   2 Sheets-Sheet 2

United States Patent Office 3,070,966
Patented Jan. 1, 1963

3,070,966
PRODUCTION OF OXYGEN
Martin S. W. Ruhemann, Brooklands, Sale, England, and Laurel E. Putman, Livingston, N.J., assignors to Superior Air Products Co., Newark, N.J., a corporation of Delaware
Filed Mar. 28, 1961, Ser. No. 98,958
Claims priority, application Great Britain Apr. 4, 1960
11 Claims. (Cl. 62—29)

This invention is concerned with the production of substantially pure oxygen from air by low temperature methods of separation and a principal object of the invention has been to provide a novel and improved method and apparatus for the production of oxygen which exhibits improved thermodynamic efficiency.

Another object of the invention has been to provide such a method and apparatus which can operate efficiently with air supplied at relatively low pressures, e.g., 120 p.s.i.g.

Still another object of the invention has been to provide such a method and apparatus in which the only power required is that needed to compress the input air.

In recent years there has been a demand for oxygen producing plants which can be installed on site and the oxygen distributed under moderately elevated pressures in pipelines to points of use. For most applications the pressures required vary from about 20 p.s.i.g. to about 100 p.s.i.g., and the invention is primarily concerned with a low temperature separation process and plant which will deliver oxygen at pressures within this range.

In plants hitherto available for the production of oxygen by low temperature methods of separation from air, oxygen gas is delivered at atmospheric pressure from the fractionating columns and heat exchangers and is then compressed in multi-stage oxygen compressors. As is known there are disadvantages associated with the use of oxygen compressors. They are large and expensive, their mechanical efficiency is relatively low and they require considerable maintenance. Also as they are generally lubricated with distilled water, the compressed oxygen is wet and has to be dried before use for many applications.

More recently, it has been proposed to withdraw the oxygen as liquid from the low temperature plant and to use liquid oxygen pumps for compression. Though this has certain advantages, when compared with the use of oxygen compressors, liquid oxygen pumps also require considerable maintenance and their use leads to no saving in power. Furthermore, difficulty is experienced in warming up the compressed liquid oxygen in the heat exchangers.

It is known in the separation of air into substantially pure oxygen and nitrogen, to use a double fractionating column comprising a lower column operating under pressure as an exhausting column in which the air is separated into nitrogen and oxygen-enriched air and an upper column operating at atmospheric pressure in which the oxygen-enriched air is further separated to give substantially pure oxygen. A condenser at the top of the lower column which provides reflux for the lower column is surrounded by the lower part of the upper column and serves as the evaporator of the upper column. Such plants and other low temperature air separation plants have hitherto been operated with an air input pressure of about 220 p.s.i.g. The oxygen, however, is delivered at atmospheric pressure and has to be compressed as indicated above.

It has now been found that by operating both columns of a double fractionating column air separation plant under pressure, the lower column being at a higher pressure than the upper column, and utilizing nitrogen under pressure from the upper column to provide cold for the system by expanding it through an expansion turbine, a process for the production of oxygen at moderately elevated pressure may be provided, which is not only advantageous from the economic point of view but also avoids the use of oxygen compressors or pumps.

When operated with an air inlet pressure of 120 to 130 p.s.i.g., which can be obtained with a two-stage compressor, to produce oxygen at about 20–25 p.s.i.g., the power requirement is reduced as compared with the prior art processes. The process may, however, also be operated at higher pressures, e.g., an air input pressure of 200 to 220 p.s.i.g. to produce oxygen at about 50–55 p.s.i.g., and though this does not result in any economy in power consumption it still offers the important advantage of avoiding the need to compress the product and thus to use oxygen compressors. As is normal with low temperature air separation processes, carbon dioxide and moisture are removed from the air before it is fed to the low temperature plant.

The invention accordingly comprises a method and apparatus for the production of oxygen at an elevated pressure in which air, from which $CO_2$ and moisture have been removed and which is at superatmospheric pressure, is cooled and then fractionated in a double fractionating column operating at elevated pressures, the first or lower column being at a higher pressure than the second or upper column which is at a superatmospheric pressure and in which the nitrogen leaving the said second or upper column at an elevated pressure is expanded through a high speed gas turbine to produce cold for use in the process.

The oxygen gas which leaves the uper column at an elevated pressure is warmed up in cooling incoming air and is delivered at a pressure close to that of the upper column. Further boosting of this pressure, if required, may be economically obtained by passing the oxygen through the blower brake of the gas turbine.

An important advantage of the invention is that passing the gaseous nitrogen product of the second column through a high speed gas turbine provides all the refrigeration required other than that used to cool the input air from the temperatures achieved during compression to ambient temperature. And since this cooling of the input air may be by indirect heat exchange with water, no refrigeration power is required in carrying out this process of the invention. Another important advantage of the invention is that the only power required is that necessary to compress the input air, and, if desired, to refrigerate the compressed air to ambient temperature if water cooling be not convenient.

Figure 2:
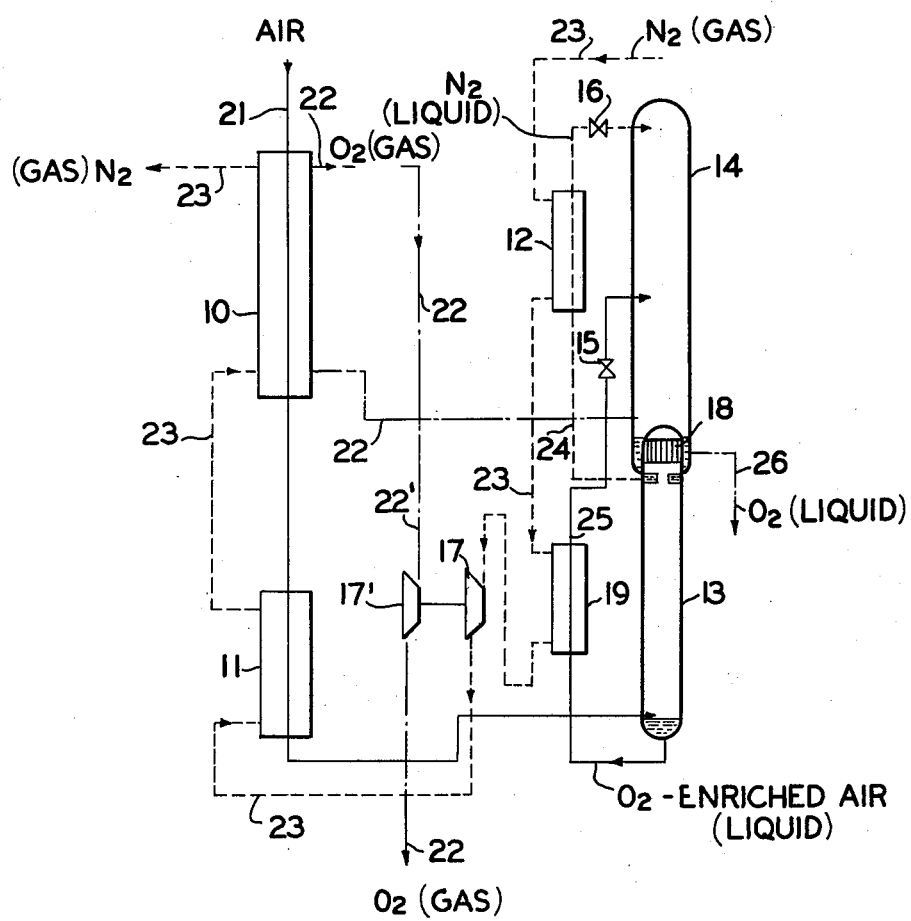

Other and further objects, features and advantages of the invention will become apparent from the following detailed description made with reference to the accompanying drawings in which:

FIG. 1 is a schematic diagram illustrating one form of apparatus in accordance with the invention for carrying out the method of the invention; and FIG. 2 is a schematic diagram illustrating a modification of the apparatus of FIG. 1.

In FIGS. 1 and 2 of the drawings, similar parts are indicated by the same reference numerals. Thus in both FIGS. 1 and 2, reference numerals 10, 11 and 12 refer to heat exchangers, 13 and 14 are respectively the lower and upper columns of a double fractionating column, 15 and 16 are expansion valves and 17 is a high speed gas turbine. The path of the input air is represented by the line 21, the path of the oxygen gas product by line 22, the path of nitrogen gas by line 23 and that of nitrogen liquid by line 24.

Referring to FIG. 1, the feed or input air is at a pressure of 130 p.s.i.g. and has been freed from $CO_2$, dried and precooled to ambient temperature. Compression to 130 p.s.i.g. may be carried out in conventional manner in a two-stage, reciprocating air compressor and carbon dioxide may be removed by scrubbing in known manner with caustic-soda solution. Drying may also be carried out in conventional manner using alumina driers with precooling, if desired, to about 2 to 5° C. to first condense out the major part of the water vapour. Water cooling or a separate refrigerating unit of known type may be used for precooling the air to ambient temperature. The compressing, scrubbing, drying and precooling means are conventional and accordingly are not illustrated.

The air feed 21, freed from $CO_2$ and moisture and at a pressure of 130 p.s.i.g. and at ambient temperature is passed through heat exchanger 10 in which it is cooled to about —150° C. and then through heat exchanger 11, in which it is cooled to about —166° C. with slight liquefaction. The degree of liquefaction achieved will depend on the heat balance of the double fractionating column. The partially liquefied air at about —166° C. is fed into the bottom of lower column 13 of a double fractionating column and is fractionated in this lower column 13, which is operating at about 125 p.s.i.g., to yield liquid nitrogen as the overhead product and liquid oxygen-enriched air as the bottom product. The condenser 18 of column 13 provides the reflux for the lower column (which operates as an exhausting column) and acts as an evaporator for the upper column 4.

The oxygen-enriched air at a temperature of —166° C. from the bottom of column 13 is fed via line 25 through an expansion valve 15 to an intermediate plate of the upper column 14 which operates at a pressure of 24 p.s.i.g. The liquid nitrogen at a temperature of —170° C. from the top of column 13 is passed via line 24 through the heat exchanger or sub-cooler 12, in which it is cooled to —180° C. and expansion valve 16 into top of column 14 to provide reflux for the operation of this column. Liquid oxygen collects at bottom of column 14 and substantially pure oxygen gas is taken off at a temperature of —172° C. just above the level of the liquid oxygen. This oxygen gas is passed via line 22 through heat exchanger 10 in which it is warmed to ambient temperature and which it leaves at about 22 p.s.i.g. Nitrogen gas leaving the top of column 14 at a temperature of —186° C. and at a pressure of 24 p.s.i.g. is passed via line 23 through sub-cooler 12 in which it is warmed to about —175° C. and is then expanded in turbine 17 to a pressure of 3 p.s.i.g. and thereby cooled to about —190° C. This very cold nitrogen is warmed up in heat exchanger 11 to about —172° C. and further warmed up in heat exchanger 10 to ambient temperature. The nitrogen leaves heat exchanger 10 at approximately atmospheric pressure.

The oxygen leaving heat exchanger 10 at ambient temperature and at a pressure of 22 p.s.i.g. may be taken off and utilized at this pressure. Alternatively, in accordance with a feature of the invention, it may be passed through the blower brake 17' of turbine 17 (as shown by line 22' of FIG. 1) whereby the pressure may be boosted to about 35 p.s.i.g.

It will be appreciated that the process illustrated by FIG. 1 yields oxygen at a moderately elevated, but useful pressure, with an extremely low power consumption. The refrigeration required for operation of the process is supplied by the process itself, so that the only power consumption is that required to compress the air fed to heat exchanger 10.

In the process illustrated by FIG. 2, the air is fed to heat exchanger 10 at a pressure of 207 p.s.i.g., having been compressed in a three-stage air compressor and freed from $CO_2$ and moisture. The method of operation in this case is very similar to that of FIG. 1.

The air leaves heat exchangers 10 and 11 at temperatures of —141° C. and —158° C. respectively and the columns 13 and 14 are operated at pressures of 195 p.s.i.g. and 59 p.s.i.g. respectively.

By compressing the air to a higher pressure and therefore operating the upper column 14 at a higher pressure, a higher pressure is available at the inlet to turbine 17. If gaseous oxygen only is being produced, the additional cold which the turbine can produce is not useful and in fact the nitrogen has to be throttled at the entry to the turbine so as to avoid the production of excess cold and the swamping of the column. The potential additional cold may, however, be made use of by taking off some of the oxygen product as liquid as shown at 26, FIG. 2.

When the upper column 14 is operating at a pressure in excess of 25 p.s.i.g. it will generally be found necessary to raise the turbine inlet temperature to avoid liquefying the nitrogen in the turbine. This is done by using an additional sub-cooler 19 as shown in FIGURE 2. As the "rich" liquid stream 25 leaving the base of column 13 is warmer than the "poor" or nitrogen liquid stream 24 leaving the top of column 13, the sub-cooler 19 enable heating of the nitrogen stream 23 to a higher temperature before it enters the turbine 17 and thus eliminates the danger of liquefaction in the turbine itself which could lead to mechanical failure and ultimate seizure. The need for the sub-cooler 19 depends on the required purity of the oxygen product which determines the ratio of "rich" to "poor" liquid flow.

Referring to FIGURE 2, the input air at a pressure of 207 p.s.i.g. and at ambient temperature is cooled in heat exchanger 10 to —141° C. and in heat exchanger 11 to —158° C. with slight liquefaction. The partially liquefied air is then fed to the bottom of column 13 which is operating at about 190 p.s.i.g. The $O_2$-enriched liquid air at —159° C. is passed from the bottom of column 13 via sub-cooler 19, in which it is cooled to —165° C., and expansion valve 15 to an intermediate plate of column 14 which is operating at 59 p.s.i.g. Liquid nitrogen at —163° C. from the top of column 13 is passed via sub-cooler 12, in which it is cooled to —177° C., and expansion valve 16 to top of column 14. Gaseous nitrogen at —179° C. from top of column 14 is passed through sub-coolers 12 and 19 in which it is warmed up to —168° C. and —161° C. respectively and then to the inlet of turbine 17, in which it is expanded to about 3 p.s.i.g. and thus cooled to —190° C. The gaseous nitrogen at —190° C. is then passed through heat exchanger 11, in which it is warmed up to —163° C. and heat exchanger 10 which it leaves at about atmospheric pressure and ambient temperature. The gaseous oxygen product is taken off just above the level of the liquid oxygen in column 14 and is passed at a temperature of —163° C. to heat exchanger 10 which it leaves at ambient temperature and 55 p.s.i.g. The oxygen gas may be utilized at this pressure or passed through the blower brake 17' of turbine 17, as shown by line 22', FIGURE 2, whereby the pressure is boosted to 80 p.s.i.g. Liquid oxygen product is taken off via line 26 and passed to storage. This liquid oxygen may be evaporated and used during periods of peak demand or when the plant is shut down.

The gaseous oxygen product may be passed to a suitable pressure storage vessel from which it may be withdrawn for use. Production of the oxygen may take place simultaneously with withdrawal for use, in which case pressure control means may be used to control the operation of the plant in accordance with the take-off of oxygen for use.

Though starting up of the plant may take place with one turbine as illustrated, an additional turbine may be provided operating in parallel with turbine 17 to hasten the attainment of the required operating conditions.

All the heat exchangers used in the plant including the reflux condenser 18 are of the indirect heat exchange type and may suitably be of the corrugated-fin type, made of aluminum. The fractionating column itself may have a stainless steel shell on account of the relatively high operating pressure and be fitted with conventional, closely spaced, brass sieve plates. The cold box housing the parts illustrated is suitably insulated to avoid heat loss.

The expansion turbine is suitably of the radial inward flow type with an optimum running speed of the order of 40,000 to 45,000 r.p.m.

These turbines are normally provided with air bearings and the power is absorbed by an air blower acting as a brake and fitted directly onto the turbine shaft. Air compressed in the blower escapes through a valve or an adjustable orifice. However, when, instead of air, the oxygen gas product is passed through the blower brake to further boost the pressure of the oxygen, oxygen bearings may be substituted for the air bearings to prevent contamination of the oxygen product.

The expression "double fractionating column" used herein and in the accompanying claims includes any combination of two columns, of which the one column, i.e., the first column, operates at a higher pressure than the other column, i.e., the second column, and in which the reflux condenser of the first column serves as the evaporator or reboiler of the second column. Though such columns are usually mounted one above the other, the second column being mounted over the top of the first column, as illustrated in the accompanying drawings, this is not essential, e.g., they may be arranged side by side in known fashion.

What is claimed is:

1. The method of producing oxygen at an elevated pressure from air at a superatmospheric pressure greater than said elevated pressure and which has been processed to remove therefrom carbon dioxide and moisture, comprising the steps of cooling said air, fractionating said cooled air in a double fractionating column, both columns of which are maintained at a superatmospheric pressure, the pressure in the first column being greater than the pressure in the second column, withdrawing gaseous product oxygen at a superatmospheric pressure not less than about 20 p.s.i.g. from said second column, withdrawing gaseous nitrogen at a superatmospheric pressure from said second column, and producing refrigeration for operation of said method by expanding said withdrawn gaseous nitrogen through a high speed gas turbine.

2. The method of producing oxygen from air at a superatmospheric pressure of the order of 120–130 p.s.i.g. and substantially ambient temperature and which has been processed to remove therefrom carbon dioxide and moisture, comprising the steps of cooling said air, fractionating said cooled air in a double fractionating column, both columns of which are maintained at a substantial superatmospheric pressure, the pressure in the first column being greater than the pressure in the second column, withdrawing gaseous product oxygen at a superatmospheric pressure not less than about 20 p.s.i.g. from said second column, withdrawing gaseous nitrogen at a superatmospheric pressure from said second column, and producing substantially all refrigeration required for operation of said method by expanding said withdrawn gaseous nitrogen through a high speed gas turbine.

3. The method of producing oxygen at an elevated pressure from air at a superatmospheric pressure greater than said elevated pressure and which has been processed to remove therefrom carbon dioxide and moisture, comprising the steps of cooling said air, fractionating said cooled air in a double fractionating column, both columns of which are maintained at a substantial superatmospheric pressure, the pressure in the first column being greater than the pressure in the second column, withdrawing gaseous product oxygen at a superatmospheric pressure not less than about 20 p.s.i.g. from said second column, withdrawing gaseous nitrogen at a superatmospheric pressure from said second column, producing substantially all refrigeration required for operation of said method by expanding said withdrawn gaseous nitrogen through a high speed gas turbine having a blower brake, and increasing the pressure of said withdrawn gaseous product oxygen by passing the same through said blower brake of said turbine.

4. The method of producing oxygen at an elevated pressure greater than about 20 p.s.i.g. from air at a superatmospheric pressure of the order of 120–130 p.s.i.g. and substantially ambient temperature and which has been processed to remove therefrom carbon dioxide and moisture, comprising the steps of cooling said air, fractionating said cooled air in a double fractionating column, both columns of which are maintained at a substantial superatmospheric pressure, the pressure in the first column being greater than the pressure in the second column, withdrawing gaseous product oxygen at a superatmospheric pressure greater than about 20 p.s.i.g. from said second column, withdrawing gaseous nitrogen at a superatmospheric pressure from said second column, and producing substantially all refrigeration required for operation of said method by expanding said withdrawn gaseous nitrogen through a high speed gas turbine.

5. The method of producing oxygen at an elevated pressure from air at a substantial superatmospheric pressure greater than said elevated pressure and which has been processed to remove therefrom carbon dioxide and moisture, comprising the steps of cooling said air to a temperature at which a minor portion thereof is liquefied, supplying the resulting mixture of gaseous and liquid air to the base of the first column of a double fractionating column, said first column being maintained at a substantial superatmospheric pressure, withdrawing and expanding oxygen-enriched liquid air from the base of said first column, supplying the expanded oxygen-enriched liquid air to an intermediate point of the second column of said double column, said second column being maintained at a substantial superatmospheric pressure less than the pressure of said first column, said pressure of said column being not less than about 20 p.s.i.g., withdrawing and expanding liquid nitrogen from the top of said first column and supplying the expanded liquid nitrogen to the top of said second column, withdrawing gaseous nitrogen product from the top of said second column and passing the same in indirect heat exchange relationship with said liquid nitrogen withdrawn from the top of said first column, thereafter expanding said gaseous nitrogen product through a high speed gas turbine to a slightly superatmospheric pressure, withdrawing gaseous oxygen product at the pressure of said second column from the lower end of said second column, passing said withdrawn gaseous oxygen product and said expanded gaseous nitrogen product in indirect heat exchange relationship with said air to cool said air in said air cooling step, and thereafter collecting said gaseous oxygen product at ambient temperature and at said elevated pressure.

6. The method of producing oxygen from air at a substantial superatmospheric pressure and substantially ambient temperature and which has been processed to remove therefrom carbon dioxide and moisture, comprising the steps of cooling said air to a temperature at which a minor portion thereof is liquefied, supplying the resulting mixture of gaseous and liquid air to the base of the first column of a double fractionating column, said first column being maintained at a substantial superatmospheric pressure, withdrawing and expanding oxygen-enriched liquid air from the base of said first column, supplying the expanded oxygen-enriched liquid air to an intermediate point of the second column of said double column, said second column being maintained at a substantial superatmospheric pressure less than the pressure of said first column, said pressure of said second column being not less than about 20 p.s.i.g., withdrawing and expanding liquid nitrogen from the top of said first column and supplying the expanded liquid nitrogen to the top of said second column, withdrawing gaseous nitrogen product from the top of said second column and passing the same in indirect heat exchange relationship with said liquid nitrogen withdrawn from the top of said first column, thereafter expanding said gaseous nitrogen product through a high speed gas turbine to a slightly superatmospheric pressure to provide all the refrigeration required in operation of said method, withdrawing gaseous oxygen product at the pressure of said second column from the lower end of said second column, passing said withdrawn gaseous oxygen product and said expanded gaseous nitrogen product in indirect heat exchange relationship with said air to cool said air in said air cooling step, and thereafter collecting said gaseous oxygen product.

7. The method set forth in claim 6 in which said air cooling step comprises subjecting the incoming air to a first indirect heat exchange with said withdrawn gaseous oxygen product and with said expanded gaseous nitrogen product and thereafter subjecting said incoming air to a second indirect heat exchange with said expanded gaseous nitrogen product, said expanded gaseous nitrogen product being subjected to said second indirect heat exchange before being subjected to said first indirect heat exchange.

8. The method of producing oxygen at an elevated pressure of about 20–25 p.s.i.g. from air at a substantial superatmospheric pressure of about 120–130 p.s.i.g. and which has been processed to remove therefrom carbon dioxide and moisture, comprising the steps of cooling said air to a temperature at which a minor portion thereof is liquefied, supplying the resulting mixture of gaseous and liquid air to the base of the first column of a double fractionating column, said first column being maintained at a substantial superatmospheric pressure, withdrawing and expanding oxygen-enriched liquid air from the base of said first column, supplying the expanded oxygen-enriched liquid air to an intermediate point of the second column of said double column, said second column being maintained at a substantial superatmospheric pressure less than the pressure of said first column and approximately equal to said elevated pressure, withdrawing and expanding liquid nitrogen from the top of said first column and supplying the expanded liquid nitrogen to the top of said second column, withdrawing gaseous nitrogen product from the top of said second column and passing the same in indirect heat exchange relationship with said liquid nitrogen withdrawn from the top of said first column, thereafter expanding said gaseous nitrogen product through a high speed gas turbine to a slightly superatmospheric pressure, withdrawing gaseous oxygen product at the pressure of said second column from the lower end of said second column, passing said withdrawn gaseous oxygen product and said expanded gaseous nitrogen product in indirect heat exchange relationship with said air to cool said air in said air cooling step, and thereafter collecting said gaseous oxygen product at ambient temperature and at said elevated pressure.

9. The method set forth in claim 5 in which said elevated pressure lies in the range of about 50–55 p.s.i.g. and in which said air is supplied at a pressure of about 200–220 p.s.i.g.

10. The method of producing oxygen at an elevated pressure not less than about 20 p.s.i.g. from air at a substantial superatmospheric pressure greater than said elevated pressure and which has been processed to remove therefrom carbon dioxide and moisture, comprising the steps of cooling said air to a temperature at which a minor portion thereof is liquefied, supplying the resulting mixture of gaseous and liquid air to the base of the first column of a double fractionating column, said first column being maintained at a substantial superatmospheric pressure, withdrawing and expanding oxygen-enriched liquid air from the base of said first column, supplying the expanded oxygen-enriched liquid air to an intermediate point of the second column of said double column, said second column being maintained at a substantial superatmospheric pressure less than the pressure of said first column, withdrawing and expanding liquid nitrogen from the top of said first column and supplying the expanded liquid nitrogen to the top of said second column, withdrawing gaseous nitrogen product from the top of said second column and passing the same in indirect heat exchange relationship with said liquid nitrogen withdrawn from the top of said first column, thereafter passing said gaseous nitrogen product in indirect heat exchange relationship with said oxygen-enriched liquid air withdrawn from the base of said first column, thereafter expanding said gaseous nitrogen product through a high speed gas turbine to a slightly superatmospheric pressure, withdrawing gaseous oxygen product at the pressure of said second column from the lower end of said second column, passing said withdrawn gaseous oxygen product and said expanded gaseous nitrogen product in indirect heat exchange relationship with said air to cool said air in said air cooling step, and thereafter collecting said gaseous oxygen product at ambient temperature and at said elevated pressure.

11. The method of producing oxygen at an elevated pressure from air at a substantial superatmospheric pressure greater than said elevated pressure and which has been processed to remove therefrom carbon dioxide and moisture, comprising the steps of cooling said air to a temperature at which a minor portion thereof is liquefied, supplying the resulting mixture of gaseous and liquid air to the base of the first column of a double fractionating column, said first column being maintained at a substantial superatmospheric pressure, withdrawing and expanding oxygen-enriched liquid air from the base of said first column, supplying the expanded oxygen-enriched liquid air to an intermediate point of the second column of said double column, said second column being maintained at a substantial superatmospheric pressure less than the pressure of said first column but not less than about 20 p.s.i.g., withdrawing and expanding liquid nitrogen from the top of said first column and supplying the expanded nitrogen to the top of said second column, withdrawing gaseous nitrogen product from the top of said second column and passing the same in indirect heat exchange relationship with said liquid nitrogen withdrawn from the top of said first column, thereafter expanding said gaseous nitrogen product through a high speed gas turbine having a blower brake to a slightly superatmospheric pressure, withdrawing gaseous oxygen product at the pressure of said second column from the lower end of said second column, passing said withdrawn gaseous oxygen product and said expanded gaseous nitrogen product in indirect heat exchange relationship with said air to cool said air in said air cooling step, and thereafter passing said gaseous oxygen product through said blower brake to increase the pressure thereof to said elevated pressure.

References Cited in the file of this patent

UNITED STATES PATENTS

| | | |
|---|---|---|
| 2,666,303 | Schuftan | Jan. 19, 1954 |
| 2,699,047 | Karwat et al. | Jan. 11, 1955 |
| 2,753,698 | Jakob | July 10, 1956 |
| 2,836,040 | Schilling | May 27, 1958 |
| 2,908,144 | First et al. | Oct. 13, 1959 |

FOREIGN PATENTS

| | | |
|---|---|---|
| 859,762 | Great Britain | Jan. 25, 1961 |